(12) United States Patent
Kim et al.

(10) Patent No.: US 7,895,915 B2
(45) Date of Patent: Mar. 1, 2011

(54) ORGAN TYPE ACCELERATOR PEDAL ASSEMBLY

(75) Inventors: Eunsik Kim, Daegu (KR); Jongho Hong, Seoul (KR); Yangrae Cho, Hwaseong-si (KR)

(73) Assignees: Kia Motors Corporation, Seoul (KR); Hyundai Motor Company, Seoul (KR); SL Corporation, Dae Gu (KR)

( * ) Notice: Subject to any disclaimer, the term of this patent is extended or adjusted under 35 U.S.C. 154(b) by 216 days.

(21) Appl. No.: 12/323,425

(22) Filed: Nov. 25, 2008

(65) Prior Publication Data

US 2009/0151502 A1    Jun. 18, 2009

(30) Foreign Application Priority Data

Dec. 15, 2007  (KR) .................. 10-2007-0131733

(51) Int. Cl.
*G05G 1/30* (2008.04)
(52) U.S. Cl. .......................................... 74/513
(58) Field of Classification Search .................. 74/512, 74/513, 560
See application file for complete search history.

(56) References Cited

U.S. PATENT DOCUMENTS

| | | | | |
|---|---|---|---|---|
| 3,500,702 A | * | 3/1970 | Nautsch et al. | 74/560 |
| 4,218,937 A | * | 8/1980 | Albrecht et al. | 74/513 |
| 5,507,201 A | | 4/1996 | Fairbairn et al. | |
| 6,289,762 B1 | * | 9/2001 | Silva | 74/513 |
| 2005/0217410 A1 | * | 10/2005 | Sakuraba et al. | 74/513 |
| 2007/0000345 A1 | * | 1/2007 | Leone | 74/513 |
| 2007/0157755 A1 | * | 7/2007 | Kim et al. | 74/513 |
| 2007/0193401 A1 | | 8/2007 | Campbell | |
| 2008/0083295 A1 | | 4/2008 | Kim et al. | |
| 2009/0293666 A1 | * | 12/2009 | Kim et al. | 74/513 |
| 2010/0132503 A1 | * | 6/2010 | Hong et al. | 74/560 |

FOREIGN PATENT DOCUMENTS

| | | |
|---|---|---|
| EP | 1 440 858 A1 | 7/2004 |
| JP | 9-290663 A | 11/1997 |
| JP | 2004-106776 A | 4/2004 |
| JP | 2004-189115 A | 7/2004 |
| JP | 2005-275636 A | 10/2005 |
| KR | 10-0644796 B1 | 11/2006 |
| KR | 10-0816002 B1 | 3/2008 |

* cited by examiner

*Primary Examiner* — Vicky A Johnson
(74) *Attorney, Agent, or Firm* — Morgan, Lewis & Bockius LLP (57) ABSTRACT

An organ type accelerator pedal assembly may include a pedal arm, one end of which is connected to a pedal housing fixed to a dash panel below the driver's seat to pivot around the central axis of the one end thereof, a pedal, one end of which is pivotably hinged to a pedal bracket fixed to a floor panel under the driver's seat, a pedal connection module that connects the other end of the pedal arm with the other end of the pedal by using a ball joint connection.

6 Claims, 9 Drawing Sheets

ORGAN TYPE ACCELERATOR PEDAL ASSEMBLY

CROSS-REFERENCE TO RELATED APPLICATIONS

The present application claims priority to Korean Application Number 10-2007-0131733 filed Dec. 15, 2007, the entire contents of which application is incorporated herein for all purposes by this reference.

BACKGROUND OF THE INVENTION

1. Field of the Invention

The present invention relates to an organ type accelerator pedal assembly.

2. Description of Related Art

In general, the accelerator pedal assembly of a vehicle, a device that controls the amount of intake for a gasoline engine and controls the rpm of a diesel engine by the amount of fuel injection, is divided into a pendent type in which the accelerator pedal is hung by the dash panel and an organ type in which the accelerator pedal is mounted on the floor panel.

Recently, the pendent type of accelerator pedal assembly is widely used, but it cannot provide good operational sensitivity to the driver, thereby increasing fatigue.

On the contrary, according to the organ type of accelerator pedal assembly that can remove the drawbacks of the pendent type, fatigue is reduced by improving the operational sensitivity for the driver and the throttle valve can be accurately controlled, such that it can satisfy both the economical efficiency and safety. Further, using the organ type of accelerator pedal is helpful for the vehicle's deluxe impression by improving the interior beauty, such that application of the organ type of accelerator is significantly increasing from deluxe vehicles in recent years.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an organ type accelerator pedal assembly that gives improved operational sensitivity to a driver and prevents sprain the driver's ankle in a collision and poor operation of the pedal by preventing objects from being stuck between the pedal and the pedal bracket.

An organ type accelerator pedal assembly according to an aspect of the present invention may include a pedal arm, one end of which is connected to a pedal housing fixed to a dash panel below the driver's seat to pivot around the central axis of the one end thereof, a pedal, one end of which is pivotably hinged to a pedal bracket fixed to a floor panel under the driver's seat, and/or a pedal connection module that connects the other end of the pedal arm with the other end of the pedal by using a ball joint connection.

The organ type accelerator pedal assembly may further include a pedal hinge film integrally formed at the one end of the pedal facing the pedal bracket, and/or a film insertion groove formed at the pedal bracket and configured to open to upper side thereof in a traverse direction of the pedal bracket and a distal end portion of the opening opens to receive the pedal hinge film therethrough.

The pedal connection module may include a ball joint housing that has a plurality of connection protrusions around the outer circumference thereof and a ball connection groove open to one lateral side, the ball joint housing configured to be fitted into the other end portion of the pedal arm, and/or a ball joint member including a ball fitted in the ball connection groove at one end thereof and connection pins formed at the other end thereof and configured to be pivotally connected to lower side of the pedal at the other end portion thereof.

The pedal arm at the other end portion thereof may have a housing insertion groove to receive the balljoint housing and protrusion connection holes are formed in the housing connection groove to receive the connection protrusions of the balljoint housing therethrough Upper portion of the connection pin may be narrower than lower portion thereof so that the connection pin is slidably connected to the pedal.

A pair of ribs facing each other and each having a rib groove to receive the connection pins of the balljoint may be formed on the lower side of the pedal. A slope may be formed at a predetermined portion around the outer circumference of the connection pin so that the connection pin is smoothly fitted into the rib groove.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
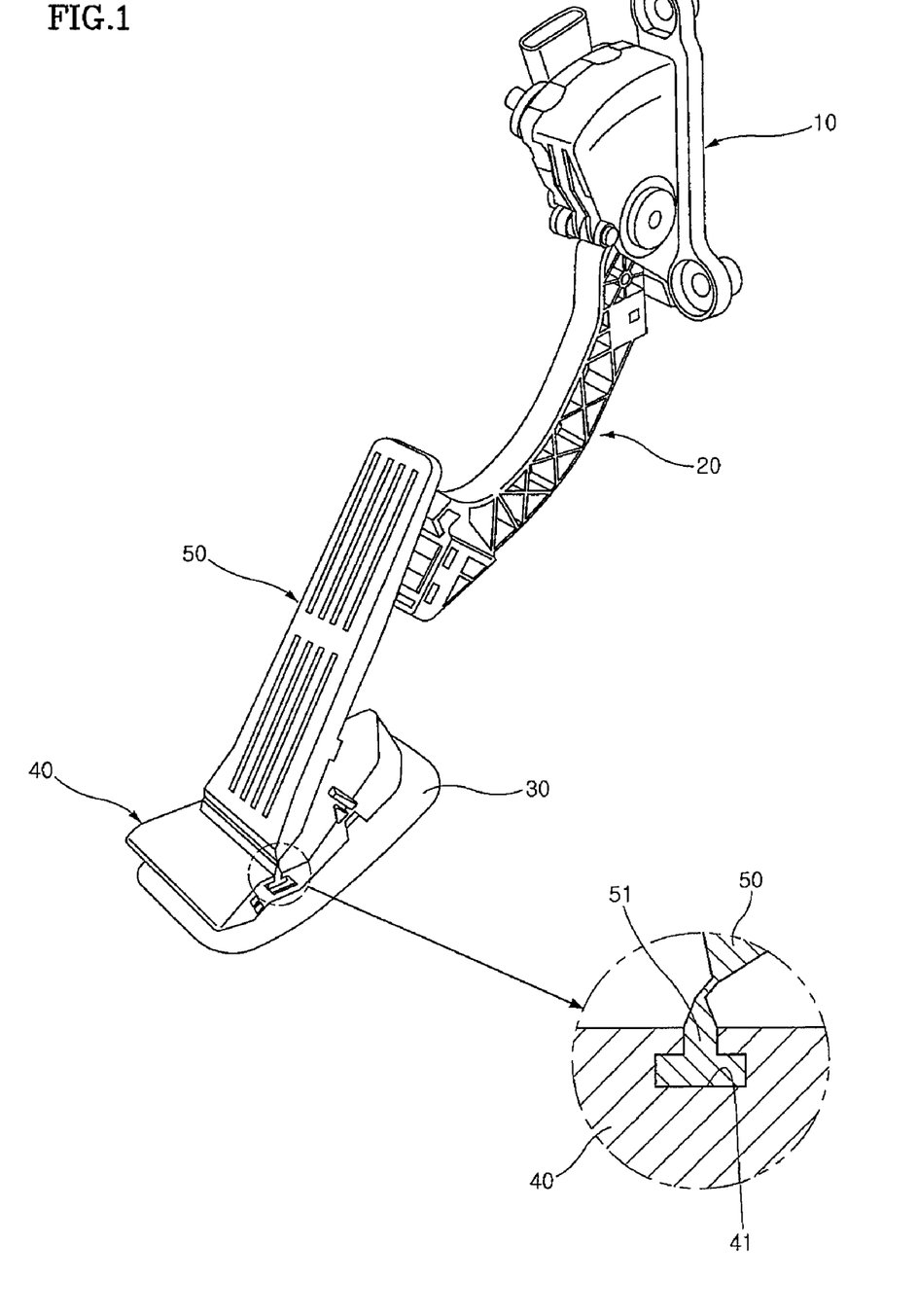
FIGS. 1 to 3 are a perspective view, a side view, and an exploded perspective view of an organ type accelerator pedal assembly according to an exemplary embodiment of the present invention.
Figure 2:
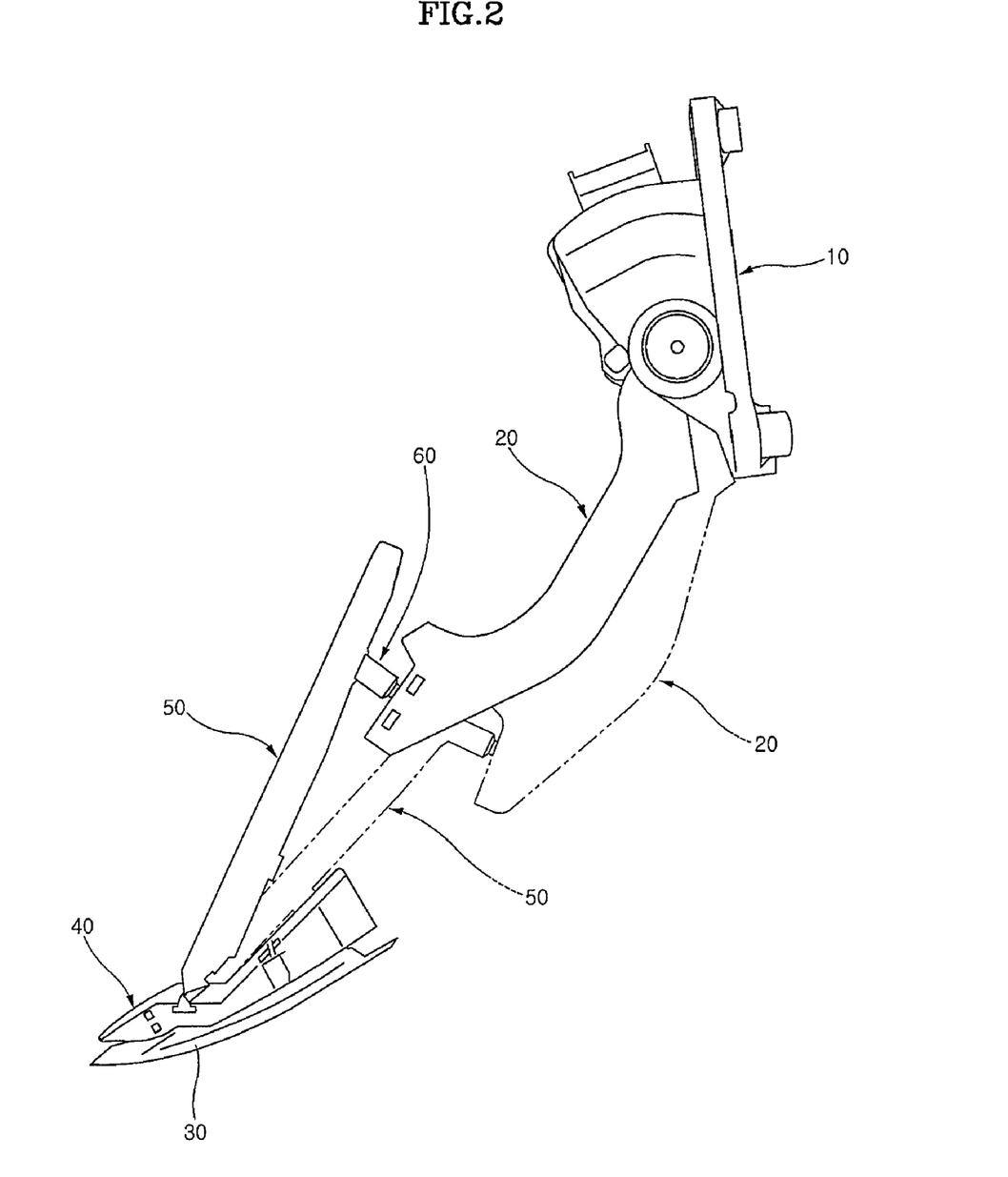
Figure 3:
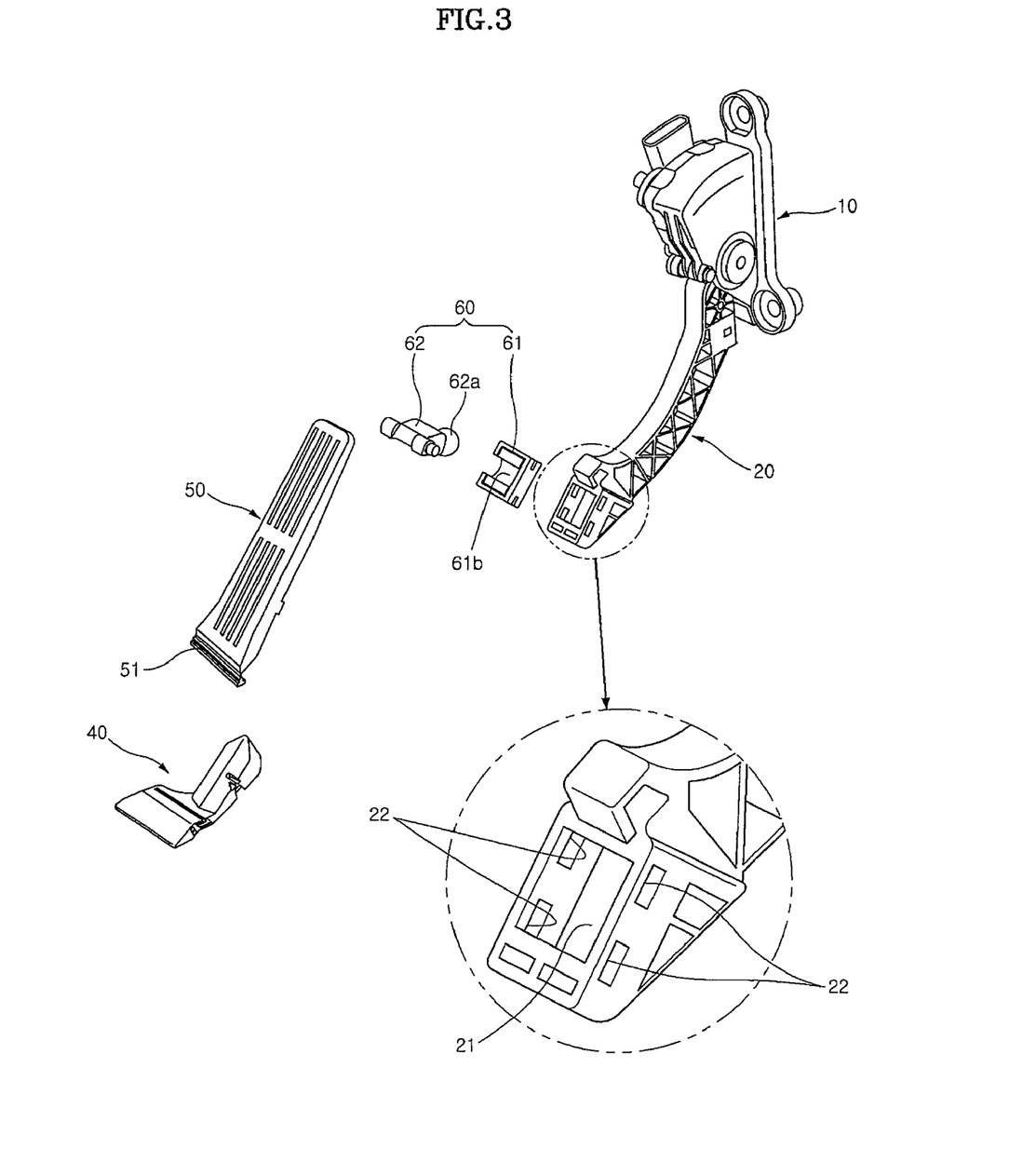
Figure 4:
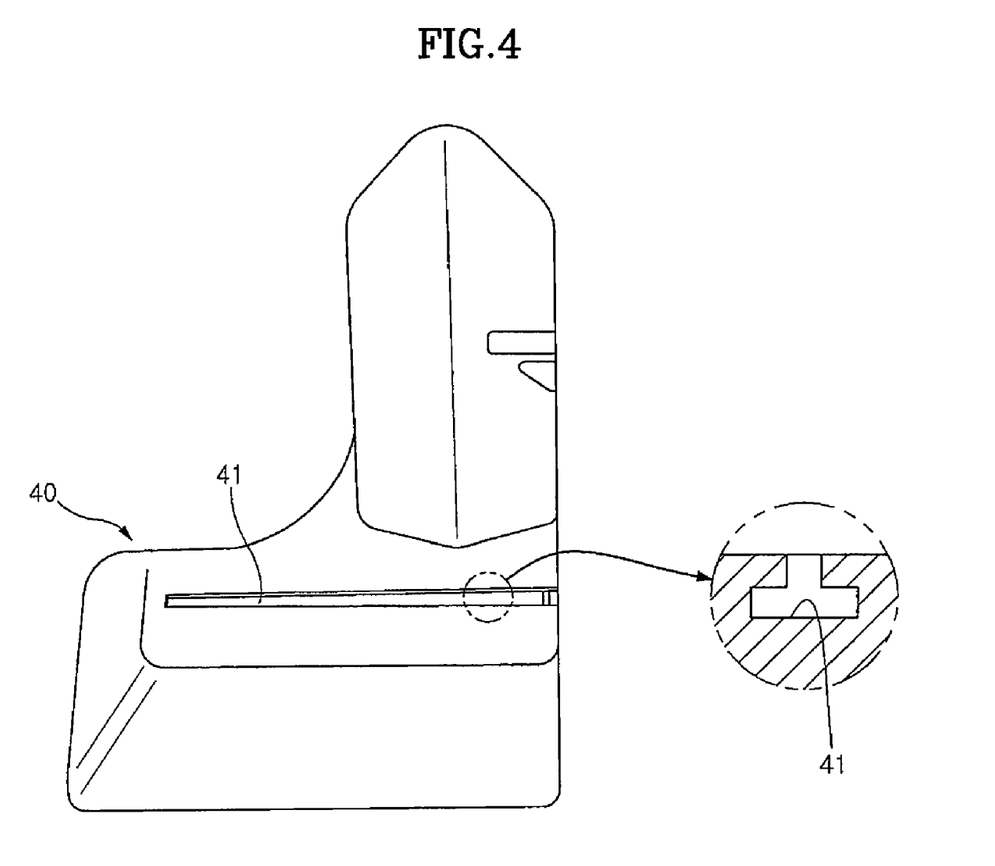
FIG. 4 is a view showing a pedal bracket having a film insertion groove according to an exemplary embodiment of the present invention.
Figure 5:
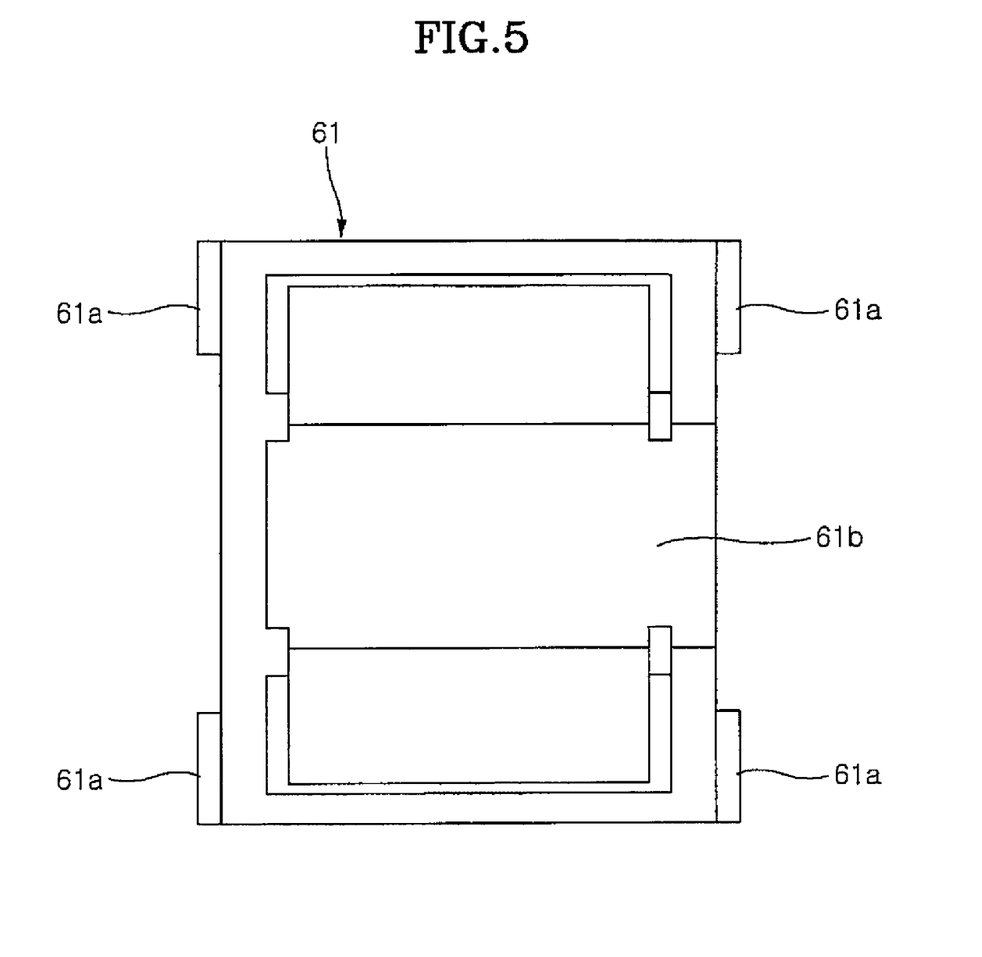
FIGS. 5 and 6 are a view showing a pedal connection module according to an exemplary embodiment of the present invention.
Figure 6:
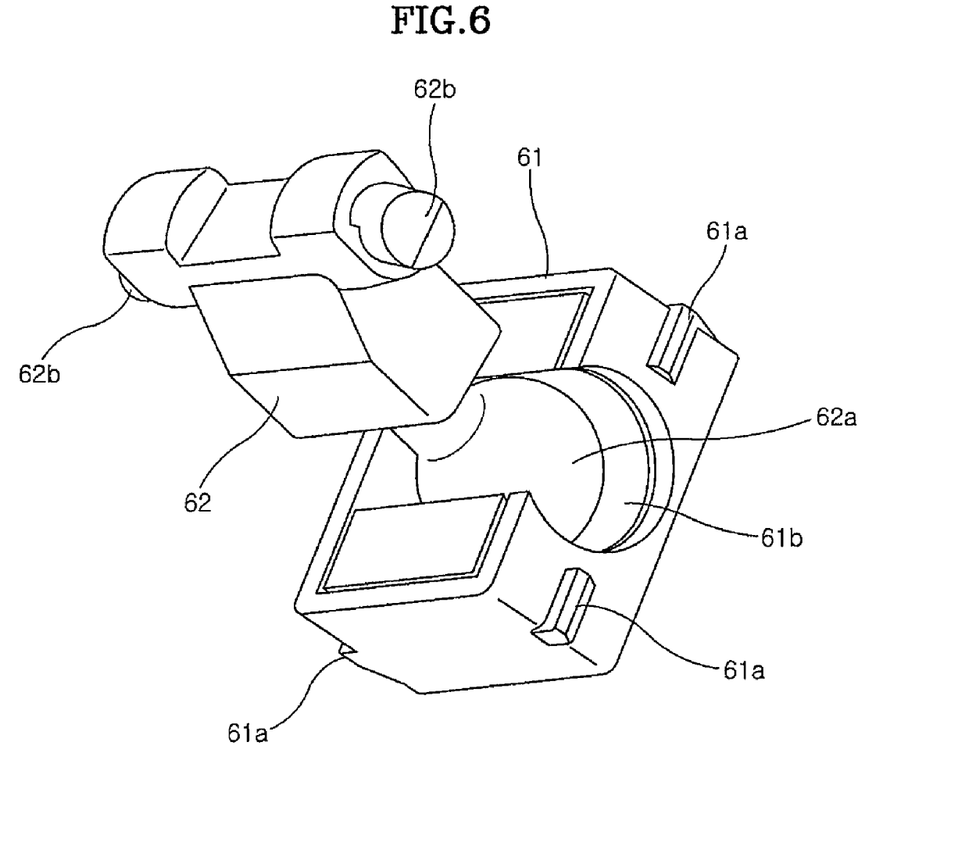

An organ type accelerator pedal assembly according to various exemplary embodiments of the present invention, as shown in FIGS. 1 to 3, includes: a pedal arm 20 that has an end connected to a pedal housing 10 fixed to a dash panel below the driver's seat to pivot around the central axis of the end, a pedal 50 that has an end pivotably hinged to a pedal bracket 40 fixed to a floor panel 30 under the driver's seat, and a pedal connection module 60 that connects pedal arm 20 with pedal 50 using a balljoint connection.

In the configuration of the organ type accelerator pedal assembly, the connection structure of pedal bracket 40 and pedal 50 is described first with reference to FIGS. 1 to 4.

A pedal hinge film 51 integrally formed with pedal 50 facing pedal bracket 40 is provided at an end of pedal 50.

Pedal 50 and pedal hinge film 51 can freely bend at the connection portion of pedal hinge film 51 and pedal 50 because the connection portion is very small in thickness.

A film insertion groove 41 where pedal hinge film 51 is fitted is formed in pedal bracket 40.

Film insertion groove 41 is open to the upper side and one of the left and right sides of pedal bracket 40 in a traverse direction thereof.

Therefore, when pedal hinge film 51 is fitted in film insertion groove 41, pedal hinge film 51 is kept fixed to pedal bracket 40 by film insertion groove 41, but pedal 50 can freely bend with respect to pedal hinge film 51, such that pedal 50 can pivot about pedal bracket 50.

Pedal connection module 60 is described next with reference to FIGS. 5 to 9.

Pedal connection module 60 includes a balljoint housing 61 that is formed in a rectangular parallelepiped shape having a plurality of connection protrusions 61a around the outer circumference thereof and a ball connection groove 61b open to the upper side and any one of the outer side to fit pedal arm 20, and a balljoint member 62 that has a ball 62a fitted in ball connection groove 61b at one end and connection pins 62b connected to the lower side of pedal 50 by fitting at both sides of the other end.

Figure 7:
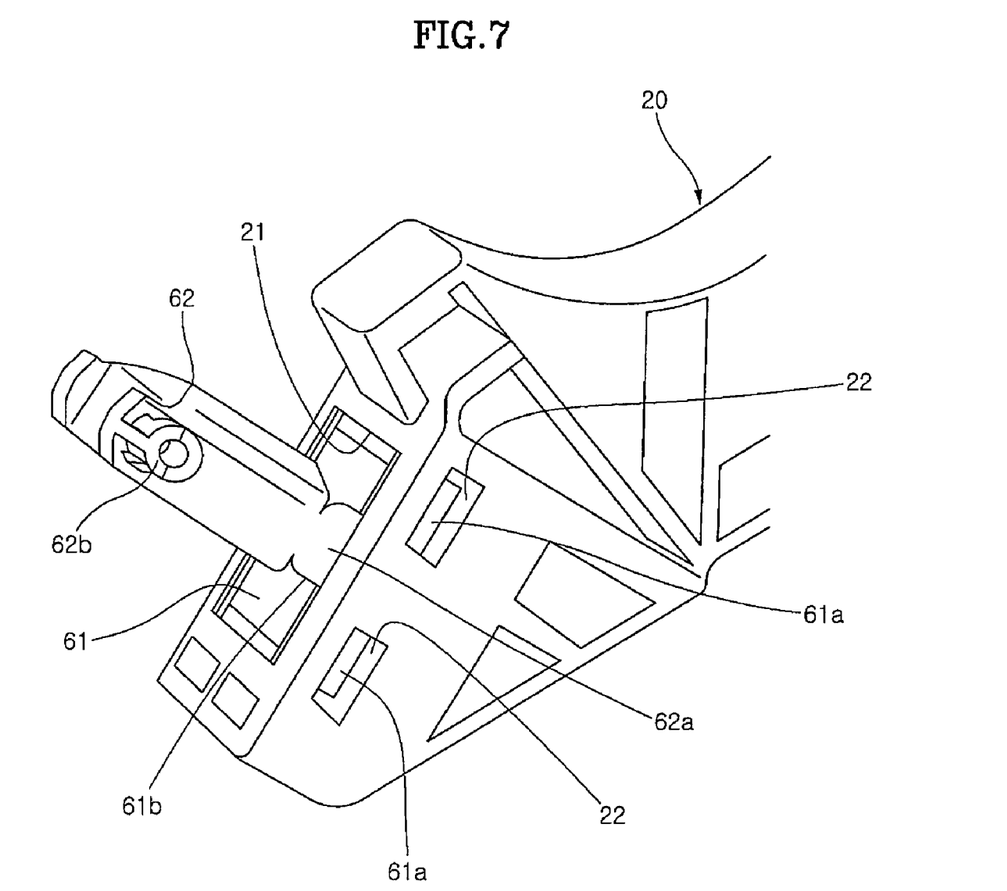
FIG. 7 is a view illustrating the pedal connection module is connected to a pedal arm according to an exemplary embodiment of the present invention.

In order to mount pedal connection module 60, pedal arm 20 has a rectangular housing insertion groove 21 to fit balljoint housing 61 therein and protrusion connection holes 22 passing through the side of pedal arm 20 is formed in the housing connection groove 21 to fit connection protrusions 61a of balljoint housing 61.

Figure 8:
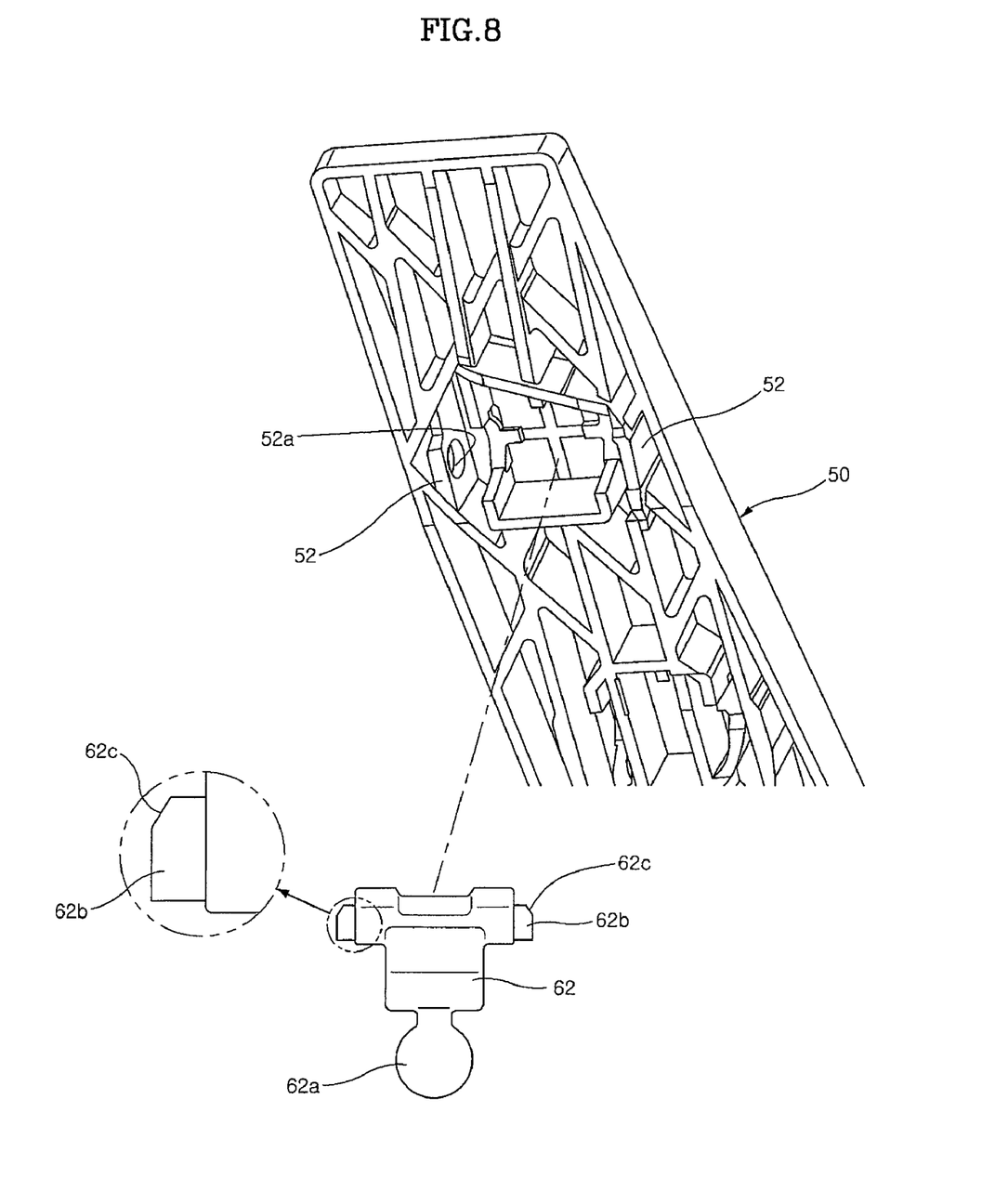
FIGS. 8 and 9 are a perspective view and a cross-sectional view illustrating a balljoint member is connected to the pedal according to an exemplary embodiment of the present invention.
Figure 9:
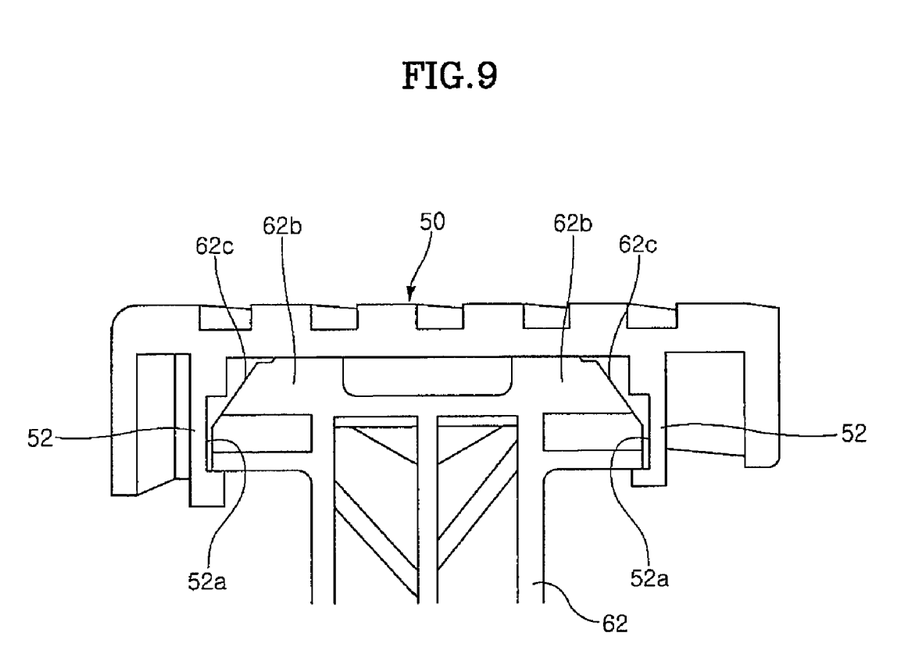

Further, a pair of ribs 52 facing each other and each having a rib groove 52a to fit connection pins 62b of ball joint 62 is formed on the lower side of pedal 50.

On the other hand, to help connecting balljoint member 62 to pedal 50, a slope is 62c formed at a predetermined portion around the outer circumference of connection pin 62b so that connection pin 62b is smoothly fitted into rib groove 52a.

When pedal connection module 60 that is used to connect pedal arm 20 with pedal 50 has the balljoint connection structure as described above, pedal arm 20 and pedal 50 can be smoothly connected because a tolerance is considered in manufacturing them; therefore, it is possible to more freely design pedal arm 20 and pedal 50.

Further, by using the balljoint connection, it is possible to prevent deterioration of quality due to assembly distribution and correspondingly remove a gap tolerance, such that it is possible to provide considerably improved operational sensitivity to the driver.

As described above, an accelerator pedal assembly according to various aspects of the present invention makes it possible to freely design each part, such that it is possible to combine the parts with easy and provide improved operational sensitivity to the driver after the accelerator pedal is assembled.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An accelerator pedal assembly comprising:
   a pedal arm, one end of which is connected to a pedal housing fixed to a dash panel below the driver's seat to pivot around the central axis of the one end thereof;
   a pedal, one end of which is pivotably hinged to a pedal bracket fixed to a floor panel under the driver's seat; and
   a pedal connection module that connects the other end of the pedal arm with the other end of the pedal by using a ball joint connection;
   wherein the pedal connection module includes:
      a ball joint housing that has a plurality of connection protrusions around the outer circumference thereof and a ball connection groove open to one lateral side, the ball joint housing configured to be fitted into the other end portion of the pedal arm; and
      a ball joint member including a ball fitted in the ball connection groove at one end thereof and connection pins formed at the other end thereof and configured to be pivotally connected to lower side of the pedal at the other end portion thereof.

2. The accelerator pedal assembly as defined in claim 1, further comprising:
   a pedal hinge film integrally formed at the one end of the pedal facing the pedal bracket; and
   a film insertion groove formed at the pedal bracket and configured to open to upper side thereof in a traverse direction of the pedal bracket and a distal end portion of the opening opens to receive the pedal hinge film therethrough.

3. The accelerator pedal assembly as defined in claim 1, wherein the pedal arm at the other end portion thereof has a housing insertion groove to receive the ball joint housing and protrusion connection holes are formed in the housing connection groove to receive the connection protrusions of the balljoint housing therethrough.

4. The accelerator pedal assembly as defined in claim 1, wherein upper portion of the connection pin is narrower than lower portion thereof so that the connection pin is slidably connected to the pedal.

5. The accelerator pedal assembly as defined in claim 1, wherein a pair of ribs facing each other and each having a rib groove to receive the connection pins of the balljoint is formed on the lower side of the pedal.

6. The accelerator assembly as defined in claim 5, wherein a slope is formed at a predetermined portion around the outer circumference of the connection pin so that the connection pin is smoothly fitted into the rib groove.

* * * * *